US005762414A

United States Patent [19]

Montalan et al.

[11] Patent Number: 5,762,414

[45] Date of Patent: Jun. 9, 1998

[54] INDICATING LIGHT, IN PARTICULAR A COMPLEMENTARY STOP LIGHT FOR A MOTOR VEHICLE, HAVING A NUMBER OF LIGHT SOURCES IN LINE WITH EACH OTHER

[75] Inventors: Dominique Montalan, Sens; Pascal Phan, Cergy; Hervé Richard, Toulouse, all of France

[73] Assignee: Valeo Vision, Babigny, France

[21] Appl. No.: 711,549

[22] Filed: Sep. 10, 1996

[30] Foreign Application Priority Data

Sep. 11, 1995 [FR] France ........................ 95 10599

[51] Int. Cl.$^6$ ........................ B60Q 1/00

[52] U.S. Cl. ........................ 362/61; 362/800; 362/249; 362/309; 362/328; 362/252

[58] Field of Search ........................ 362/61, 800, 249, 362/252, 309, 328

[56] References Cited

U.S. PATENT DOCUMENTS

| | | | |
|---|---|---|---|
| 4,733,335 | 3/1988 | Serizawa et al. | 362/80 |
| 4,851,810 | 7/1989 | Vitale et al. | 362/240 |
| 4,855,877 | 8/1989 | Otaka | 362/61 |
| 4,862,330 | 8/1989 | Machida et al. | 362/61 |
| 4,929,866 | 5/1990 | Murata et al. | 313/500 |
| 4,933,821 | 6/1990 | Anderson | 362/223 |
| 4,935,665 | 6/1990 | Murata | 313/500 |
| 4,951,179 | 8/1990 | Machida | 362/61 |
| 4,959,757 | 9/1990 | Nakata | 362/61 |
| 4,972,302 | 11/1990 | Masuyama et al. | 362/61 |
| 5,062,027 | 10/1991 | Machida et al. | 362/80.1 |
| 5,321,588 | 6/1994 | Weddemann et al. | 362/61 |
| 5,490,049 | 2/1996 | Montalan et al. | |
| 5,528,474 | 6/1996 | Roney et al. | 362/249 |
| 5,603,561 | 2/1997 | Ohishi | 362/80 |

FOREIGN PATENT DOCUMENTS

| | | |
|---|---|---|
| 0 633 163 | 1/1994 | European Pat. Off. . |
| 43 05 585 | 8/1994 | Germany . |

OTHER PUBLICATIONS

Patent Abstracts of Japan, vol. 010, No. 297 (E-444), 9 Oct. 1986 and JP-A-61 113290 (Sanyo Electric Co. Ltd.; (Others):01, 31 May 1986.

French Search Report dated Apr. 19, 1966.

*Primary Examiner*—Ira S. Lazarus
*Assistant Examiner*—Nhat-Hang H. Lam

[57] ABSTRACT

An indicator unit for a motor vehicle, in particular a so-called complementary rear stop light displaying a narrow strip of light, has a plurality of light sources aligned with each other in an elongate narrow housing. Each light source emits light in a given emission field. The unit includes optical means for redirecting the light emitted by the sources in a general emission direction, and an optic having optical elements for diffusing the output light of the unit. The redirecting means comprise lenses focussed in the vicinity of the respective light sources and directly exposed to the radiation emitted by the respective sources in a central part of their emission field, together with a cylindrical mirror which reflects towards the lenses the light emitted by the sources in at least an edge portion of their emission field.

11 Claims, 1 Drawing Sheet

INDICATING LIGHT, IN PARTICULAR A COMPLEMENTARY STOP LIGHT FOR A MOTOR VEHICLE, HAVING A NUMBER OF LIGHT SOURCES IN LINE WITH EACH OTHER

FIELD OF THE INVENTION

The present invention relates in general terms to indicating or signaling lights in the form of a unit (referred to herein as an "indicator unit"), and comprising a plurality of light sources of low power and small size, these light sources being arranged in line with each other, and also including means for treating the light emitted by the light sources in order to form an indicating beam having adequate photometry.

Such a unit may for example consist of a complementary or additional stop light, which is arranged in the region of the rear window of a motor vehicle. The light sources are typically, and preferably, light emitting diodes.

BACKGROUND OF THE INVENTION

A stop light has to emit a relatively intense light beam, and it is also necessary to provide a number of relatively large light sources somewhat close to each other.

The means for forming the beam from the light which is diffused by the light sources generally comprises either Fresnel lenses, which are disposed in front of the respective light sources on a common optic in the form of a panel, or a plurality of parabolic mirrors which are focussed on the respective light sources. These parabolic mirrors are made by moulding during the manufacture of the support base or housing of the indicator unit, and are clad with an appropriate reflective metallized coating or layer. With these optical means, it is generally necessary to provide from 16 to 20 light emitting diodes, spaced apart by about 15 mm.

In order to reduce the selling cost of the unit, it is desirable to try to reduce the number of light emitting diodes, by increasing the spacing between them for any given width of the indicator unit. However, in this case, in order to avoid a loss of light which is detrimental to optical performance, it becomes necessary to increase substantially the optical height of the indicator unit, and therefore its physical height, in order to recover an increased proportion of the light which is emitted by the light sources.

DISCUSSION OF THE INVENTION

An object of the present invention is to overcome the above mentioned drawbacks, and to propose an indicator unit (as defined above) in which the spacing between the various light sources can be increased, while retaining a small overall height and without any significant loss of optical output.

To this end, according to the invention, an indicating or signaling light, especially though not necessarily a complementary stop light for a motor vehicle, being an indicator unit of the type comprising a casing of small height, a plurality of light sources generally aligned with each other, each light source emitting light in a given field of emission, optical means for redirecting the light emitted by the light sources in a general emission direction, and an optic having optical elements for diffusion of the light, is characterized in that the optical means for redirecting the light comprise lenses which are focussed in the vicinity of the respective light sources, and which are directly exposed to the radiation emitted by the respective light sources in a central part of their emission field, together with a cylindrical mirror which reflects towards the said lenses the light emitted by the light sources in at least an edge portion of their emission field.

According to a preferred feature of the invention, the lenses are Fresnel lenses disposed on a common panel.

According to another preferred feature of the invention, the mirror has a parabolic profile and is focussed in the vicinity of a line which passes through the various light sources.

The emission field of each light source is preferably a cone having a half angle of about 50 degrees at its apex, and the mirror preferably covers an angular upward and downward field of emission limited to an angle of about 30 to 40 degrees with respect to the general emission direction.

The light sources are preferably light emitting diodes spaced apart by about 25 mm.

The light sources are preferably soldered on a common printed circuit, the mirror being mounted on the same printed circuit.

The mirror preferably has a flat base, whereby it is mounted on the printed circuit through interposed spacers.

Further aspects, objects, features and advantages of the present invention will appear more clearly on a reading of the following detailed description of a preferred embodiment of the invention, which is given by way of non-limiting example only and with reference to the accompanying drawings.

DESCRIPTION OF A PREFERRED EMBODIMENT OF THE INVENTION

Figure 4:
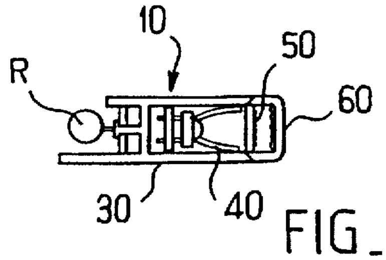
FIG. 4 is a view in cross section taken on the line IV—IV in FIG. 1.
Figure 3:
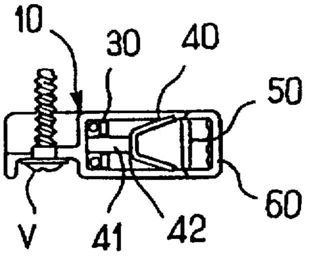
FIG. 3 is a view in cross section taken on the line III—III in FIG. 1.
Figure 1:
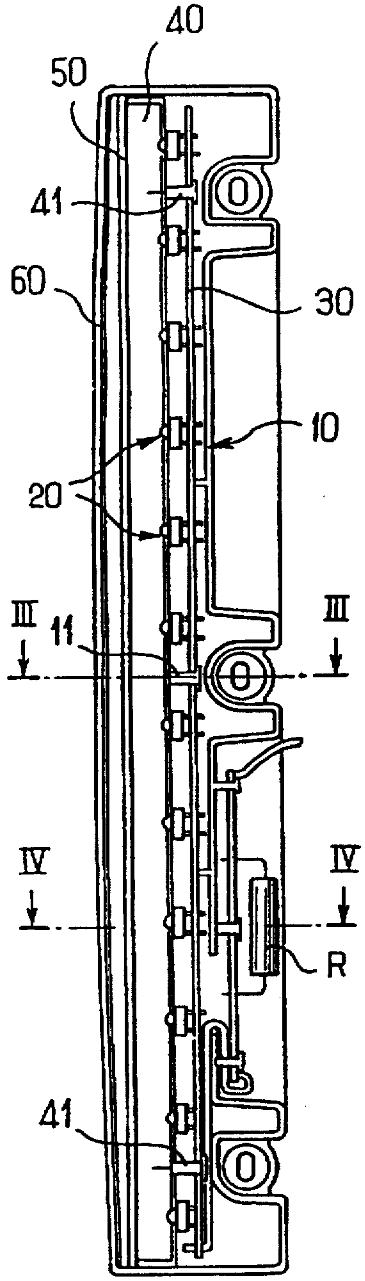
FIG. 1 is a view in horizontal cross section through a central plane, showing an indicator light in accordance with the present invention.

The drawings show an indicator unit in the form of an indicating light, which in this example is a complementary stop light unit for mounting in a rear window of a vehicle. In this description, the "front" of the unit will be regarded as the front with respect to the direction of emission of light by the stop light unit, that is to say the left hand side in FIG. 1 and the right hand side in FIGS. 3, 4 and 6.

Figure 2:
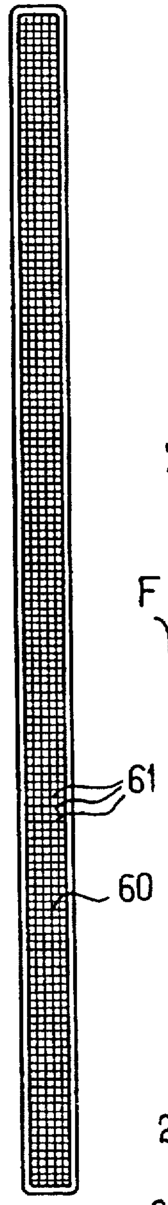
FIG. 2 is a front view of the light seen in FIG. 1.

The stop light unit includes a housing 10 which is made in an elongate form, closed at the front by an optic, or translucent front wall 60. The front wall 60 has a generally U-shaped profile and is of the elongate form which can be seen in FIG. 2. The housing 10 is fixed on the vehicle by means of screws V which are engaged in holes formed in the housing 10.

An elongate printed circuit 30 is mounted in any conventional way within the housing 10. A plurality of light emitting diodes 20 are soldered on the printed circuit in alignment with each other. These diodes are of conventional type, that is to say having a body 21, a hemispherical light-emitting portion 22, and two connecting lugs 23. The reference R designates a resistor which determines the current passing through the diodes 20. In this example the light emitting diodes 20 are spaced apart by about 25 mm, and there are twelve of them, though these figures are in no way limiting.

In a manner known per se, each light emitting diode 20 emits light in a field of emission (i.e. in a solid angle covered by the radiation) in the form of a cone having at its apex a half angle θ of about 50 degrees. It is of course possible to make use of sources having other emission fields.

In order to obtain a signaling or indicating beam having appropriate photometry, use is made of double optical means. These double optical means consist, firstly, of a mirror 40, and secondly, a panel 50 which is situated between the anterior edges of the mirror and which carries a set of reliefs constituting individual Fresnel lenses for each one of the light sources 20.

In this example, the mirror 40 is a cylindroparabolic mirror, the directrix of which is parallel to the line that passes through the various light sources, its generatrix being a parabola. Its equation in Cartesian notation is therefore of the type $y^2=Ax$, where the y axis extends horizontally in the general direction of emission, and the x axis is vertical, with the z axis extending horizontally along the line of the light sources. The mirror 40 is focussed on the line that passes through the various light sources 20.

The mirror is fixed on the printed circuit 30 by means of spacers 41 which are situated between adjacent diodes 20, and which are connected to the mirror at the level of a flat base 42 of the mirror, which is outside the reduced cone of emission of the light sources.

Figure 6:
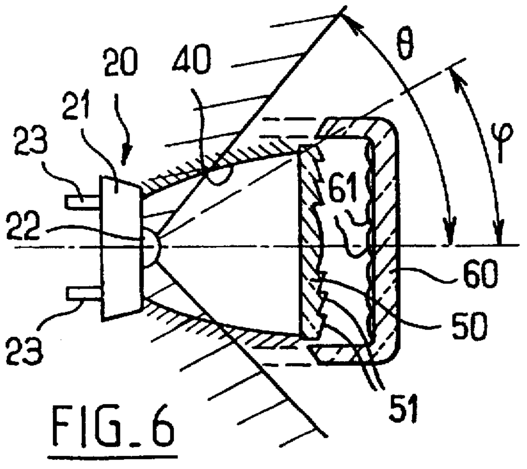
FIG. 6 is a view in transverse cross section on an enlarged scale, illustrating the optical principle embodied in the present invention.

The reliefs on the optical panel 50 are designated by the reference numeral 51 in FIG. 6, and may be situated either on its inner face or on its outer face. It is the latter arrangement which is shown in FIG. 6. The various Fresnel lenses formed by these reliefs are focussed on the respective light sources, and have axes perpendicular to the line on which the light sources are located.

As FIG. 6 clearly shows, the arrangement of the mirror 40 and the Fresnel lens panel 50 is such that part of the conical field of radiation emitted by each light source meets the associated Fresnel lens directly, while another part of this radiation, which is directed more towards the outside, meets the upper and lower portions of the mirror 40 so as to be redirected substantially horizontally by the mirror towards the respective Fresnel lenses.

More precisely, the zones Z1 show, in a plane at right angles to the axis of a respective light source, that part of the radiation which is reflected by the mirror, and which then passes through the Fresnel lens; while the zone Z2 shows that part of the radiation which is directly incident on the Fresnel lens.

The main contribution of the light which is emitted towards the zone Z2 is that it enables the stop light unit to satisfy the legal requirements as to the photometric grid, in conjunction with truncated spheres or toroids 61 for diffusing light, which are formed on the inner face of the front wall 60. The light which is emitted towards the zones Z1 contributes to an increase in luminous intensity, and also increases the homogeneity of the field of illumination by the stop light unit when it is operating, due in particular to the fact that the mirror is of the cylindrical type and does not deflect light which is emitted laterally towards the optical axis.

Figure 5:
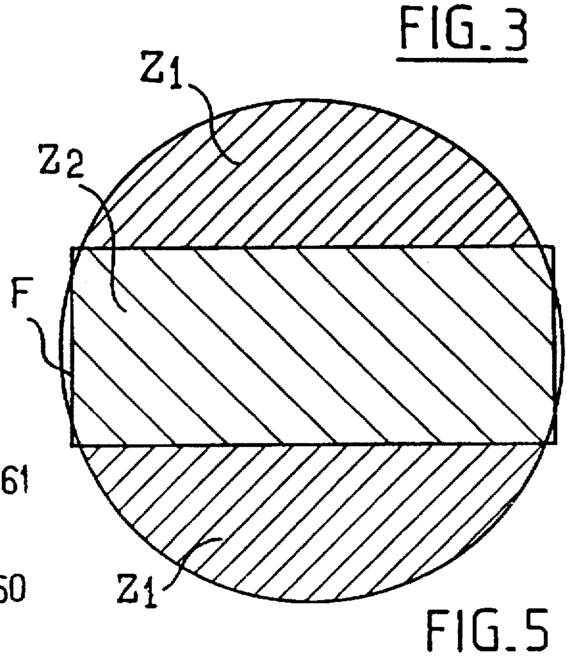
FIG. 5 shows diagrammatically the various zones in the indicator unit of the present invention which are given different optical treatments.

The contour of the window of exit of light, for the light source concerned, is designated F in FIG. 5.

The angle of the transition planes above and below the horizontal, between the zones Z1 and Z2, is designated ϕ. Its value is of course smaller than θ, and is preferably of the order of 30 to 40 degrees.

The present invention enables an indicator unit to be made which comprises twelve standard light emitting diodes spaced apart by 25 mm, the unit having a height of 10 mm at the level of the mirror 40 and panel 50, thus satisfying the regulations as regards photometry and having an intensity which is more than satisfactory, with a homogeneous field of illumination. In a particular case where this was true, the focal length of the Fresnel lenses was equal to 11 mm, and the equation of the mirror 40 was $y^2=2x$.

The present invention is of course in no way limited to the embodiment described above and shown in the drawings: a person skilled in the art will be able to apply to it any variation or modification within the spirit of the invention. Thus for example, but in a way not shown in the drawings, the mirror 40 may be made by moulding during the formation of the housing 10.

What is claimed is:

1. An indicator unit for a motor vehicle, comprising a housing defining a front of the unit, a plurality of light sources within the housing, each light source defining a given emission field in which that light source emits light and a redirecting member in the housing defining a general emission direction towards the front of the unit, the redirecting member redirecting the light emitted by the sources towards the front of the unit, wherein the redirecting member comprises lenses and a cylindrical mirror disposed optically between the light sources and the lenses, wherein each of the lenses is focused in a region of the emission field of each of the respective light sources and wherein the mirror reflects the light emitted by the light sources in at least an edge portion of their emission field.

2. A unit according to claim 1, wherein the redirecting member further comprises a panel for holding the lenses.

3. A unit according to claim 1, wherein the light sources define a common line passing through all of the light sources and wherein the mirror has a parabolic profile and the mirror is focused in a region of the common line.

4. A unit according to claim 3, wherein each light source defines an emission field in the form of a cone having a half angle of a predetermined value at its apex, the mirror covering a predetermined angular extent of upward and downward emission with respect to the general emission direction.

5. A unit according to claim 3, wherein the mirror further comprises horizontal sections that are parallel to the common line.

6. A unit according to claim 4, wherein the light sources are light emitting diodes spaced apart by about 25 mm.

7. A unit according to claim 4, wherein the predetermined value of the half angle is 50 degrees and the predetermined angular extent of upward and downward emission is an angle between 30 and 40 degrees with respect to the general emission direction.

8. A unit according to claim 1, further including a printed circuit within the housing and wherein the light sources and the mirror are connected to the printed circuit.

9. A unit according to claim 1, wherein the lenses are Fresnel lenses.

10. A unit according to claim 1, wherein each of the lenses is focused in a central portion of the emission field of each of the respective light sources.

11. An indicator unit for a motor vehicle, comprising a housing defining a front of the unit, a printed circuit within the housing, a plurality of light sources, mounting means mounting the light sources in general alignment with each other within the housing, each light source defining a given emission field in which that light source emits light and redirecting means in the housing, the redirecting means defining a general emission direction towards the front of the unit, the redirecting means redirecting the light emitted by the light sources towards the general emission direction and an optic disposed in front of the redirecting means and having optical elements for diffusing the light received from the redirecting means, wherein the redirecting means comprises lenses focused in a region of the respective light sources in a central part of their emission field, the redirecting means further comprising a cylindrical mirror disposed optically between the light sources and the lenses, the mirror for reflecting towards the lenses the light emitted by the light sources in at least an edge portion of their emission field, wherein the mirror has a flat base, the mounting means including spacers mounting the mirror in the housing, the spacers being attached to the flat base of the mirror, and wherein the light sources and the mirror are connected to the printed circuit.

* * * * *